Jan. 12, 1937.   P. T. ROBIN   2,067,861
MULTIWHEEL MOTOR VEHICLE
Filed Feb. 28, 1936    2 Sheets-Sheet 1
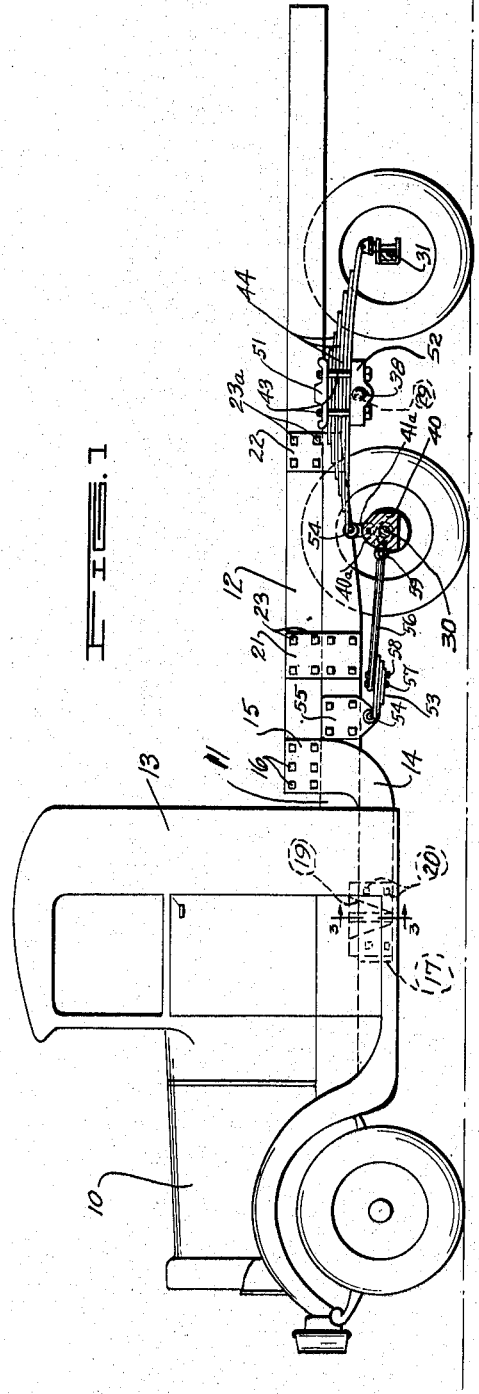
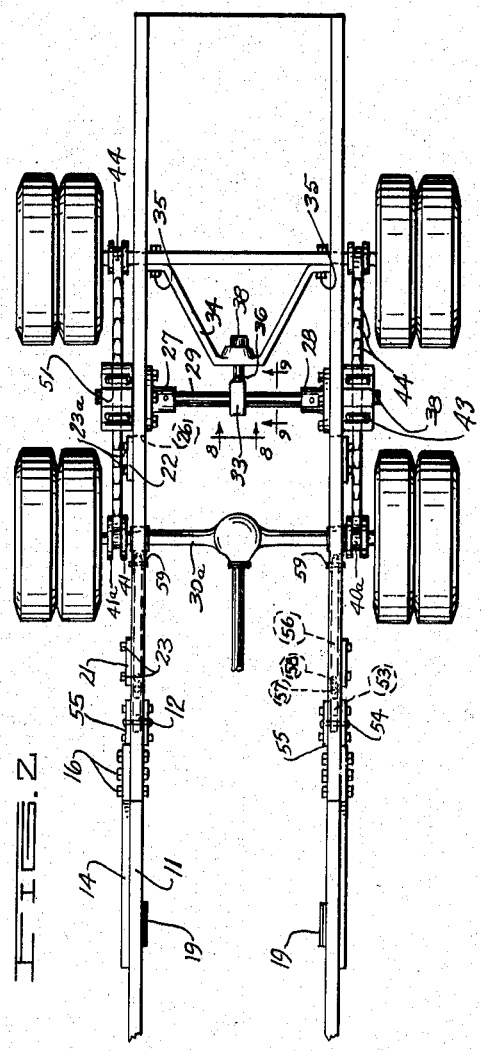
INVENTOR
PHILIP T. ROBIN
BY John A. Bommhardt
ATTORNEY Jan. 12, 1937.  P. T. ROBIN  2,067,861
MULTIWHEEL MOTOR VEHICLE
Filed Feb. 28, 1936  2 Sheets-Sheet 2
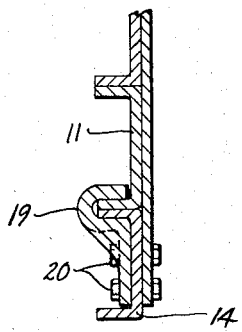
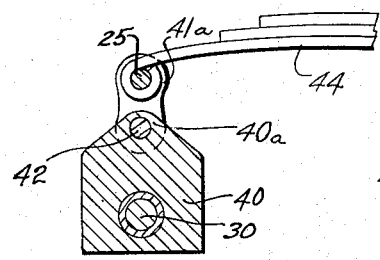
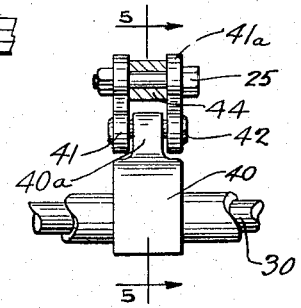
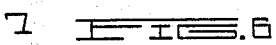
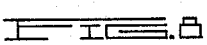
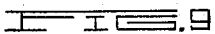
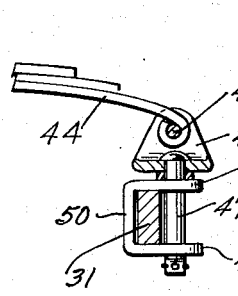
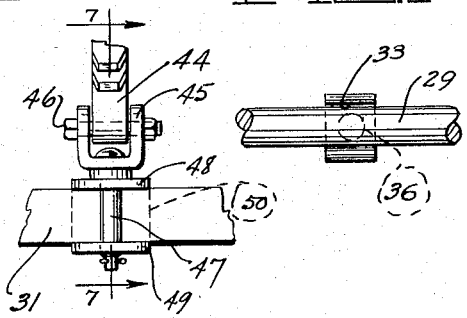
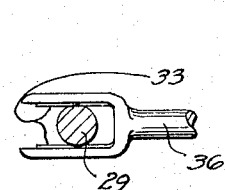
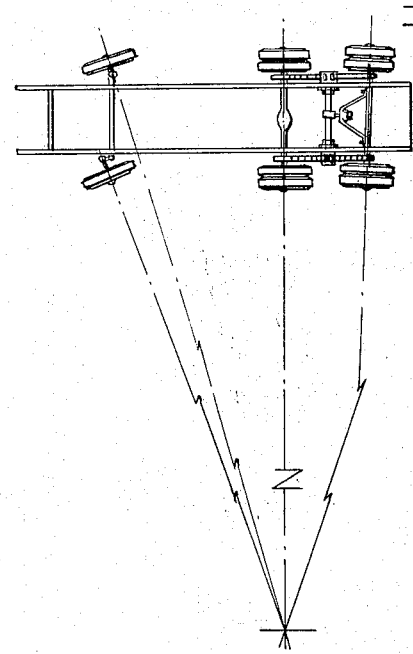
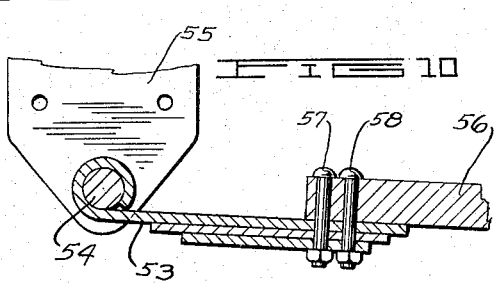
INVENTOR
PHILIP T. ROBIN
BY John A. Bommhardt
ATTORNEY Patented Jan. 12, 1937

2,067,861

UNITED STATES PATENT OFFICE 2,067,861

MULTIWHEEL MOTOR VEHICLE

Philip T. Robin, Cleveland Heights, Ohio, assignor to American Third Axle Corp., Cleveland, Ohio, a corporation of Ohio Application February 28, 1936, Serial No. 66,159

3 Claims. (Cl. 280—106.5)

This invention relates to trucks or other motor vehicles and has for its object to provide improved means for converting a four wheel truck into a six wheel truck, and which involves the addition of a supplemental or extension frame to the chassis, together with an auxiliary or dead axle and a pair of wheels; the invention involves also improved means for mounting and connecting the springs to the frame and to the axles, as well as providing an improved torque connection, the whole permitting the added wheels and axle to follow the line of movement of the vehicle, as in turning curves.

The dominant principle of my invention resides in the employment wherever possible of flexible members which may be twisted without being damaged by the misalignment of axles. These are constructed of flat leaf laminated springs and, unlike rigid members, require no expensive ball joints or universal connections.

A further object of this invention is to enable the indicated changes to be made at a slight expense and without modifying the original frame except wherein it may be found necessary to shorten the frame to clear the bearings supporting the rocker shaft.

The above and other features of my invention will be understood from the following description and its accompanying illustrations, in which:—

Fig. 1 is a side elevation of a conventional truck with the invention attached, the left rear wheels removed and axles and forward end of the rear spring mounting in section.

Fig. 2 is a plan view of the invention with its frame superimposed over the truck body.

Fig. 3 is a section on line 3—3 of Fig. 1.

Fig. 4 is an end elevation partly in section of the mounting of the forward end of the rear spring.

Fig. 5 is a section on line 5—5 of Fig. 4.

Fig. 6 is an end elevation of the swivel mounting for the rear end of the rear spring.

Fig. 7 is a section on line 7—7 of Fig. 6.

Fig. 8 is a view of the rock shaft and swivel arm on line 8—8 of Fig. 2 showing the jaw or yoke of the swivel arm.

Fig. 9 is a section on line 9—9 of Fig. 2.

Fig. 10 is a fragmentary section showing the flexible front radius rod connection.

Fig. 11 is a diagrammatic illustration showing the arching of the left rear spring and flattening of the right rear spring in making a left turn and showing the angular position of the rear axle in turning.

Again referring to the illustrations; the conventional truck 10 has superimposed over its frame 11 a supplemental or extension frame 12 which is attached to the said truck frame 11 preferably under cab 13 by means of a pair of arcuated arms 14 each of which is attached at its one end 15 by bolts 16 to the front end of the supplemental frame 12 and at its opposed end 17 by clamps 19 to the truck frame 11, as shown in Fig. 3. The clamps enclose the flanges of the frames and are secured by means of a plurality of bolts 20.

The supplemental frame 12 is also attached to the truck frame 11 by means of side plates 21 and bolts 23, said plates preferably being bolted to the truck frame 11 in such manner as to utilize the bolt holes originally used to attach the spring bracket.

As an alternative construction, welding or other means of fastening may be employed to connect the plates 21, a pair of side plates 22 and the arcuated arms 14 to the supplemental frame 12 instead of bolts.

The rear end 26 of the truck frame 11 must of necessity be shortened slightly in some instances to make room for a pair of rock shaft bearings 27 and 28 mounted on each side of the inner surface of the supplemental frame 12. To prevent lateral movement of the frame 12 with respect to the frame 11, the plates 22 are located at each side of the extreme rear end 26 of the truck frame 11 and attached to the sides of the supplemental frame 12 by bolts 23a.

A rock shaft 29 is transversely and fixedly mounted in the supplemental frame 12 by means of bearings 27 and 28 to provide pivotal support for the flat leaf springs 44 which serve to support the entire rear end of the vehicle.

It will readily be appreciated that there is an almost constant tendency for the dead axle to rotate on the axis of its bearings in the wheels, particularly so when brakes are applied to the auxiliary wheels. In order to resist this torque, or tendency to rotate, a torque-resisting member 34 is fixedly connected to the dead axle 31. A swivel arm 36, swivelly mounted in the torque-resisting member, terminates at its outer end in a jaw or yoke 33 within which the rock shaft 29 is slidably contained, as shown in Figs. 8 and 9. The opposed end of the swivel arm 36 is retained in the torque-resisting member 34 by a collar 38.

The forward end of each rear spring is mounted as shown particularly in Figs. 4 and 5, a block 40 being attached to the driving axle housing 30a, said block 40 having a vertical lug 40a projecting from the top thereof; a pair of toggle links 41 and 41a pivotally attached at their lower ends to the opposed sides of said lug 40a by means of a pivot pin 42 journaled therethrough, have a bolt 25 carried within the upper portions of the toggle links 41 and 41a upon which one or more leaves of the spring 44 are turned, the spring 44 being pivotally supported by the bolt 25 between the toggle links 41 and 41a.

The action of the spring 44 in arching and flattening tends to pivot or rock the toggle links 41 and 41a, which gives the spring 44 a pivoting movement on the bolt 25 subordinate to the action of the toggle links, thus permitting a free forward and backward movement of the end of the spring 44 relative to the driving axle housing 30a.

In the embodiment shown, a rear spring mounting 45, at the rear end of spring 44, has a swivel as well as a pivoting action, one or more of the spring leaves being turned around a bolt 46 in such manner as to permit free pivoting of the spring leaves upon the bolt 46; a pin 47 mounted through the spring mounting 45 and the top and bottom flanges 48 and 49 of the support 50, superimposed over the auxiliary or dead axle 31, gives the spring action a swiveling movement which prevents binding when the spring 44 is arched on one side and flattened on the opposed side in making a turn as is illustrated by the diagram shown in Fig. 11, thus facilitating the tendency of the auxiliary or dead axle 31 to turn toward the common center when the vehicle is turned.

Spring saddles 51 on each spring 44, midcenter of said springs, transmit the load from the springs 44 through the U-bolts 43 to the bearings 52 and thence to the rock shaft 29, which is supported at its ends within said bearings.

Flexible flat leaf spring connections 53 provide radius rods 56 with a flexible connection to the frame 11, being pivotally attached at their forward ends to horizontal pins 54 mounted rigidly through brackets 55 attached on opposed sides of the frame 11, and at their rearward ends to the forward ends of the radius rods 56 by means of bolts 57 and 58, said radius rods being attached at their ends by a horizontal pivot 59 preferably, to the rear axle housing 30a.

An additional function of the radius rods 56 with their flexible spring leaf connections 53 at their front ends and pivotal connections 59 at their rear ends, is to provide a resistance to lateral movement of the driving axle housing relative to the truck frame.

By the means described, the supplemental or extension frame 12 and auxiliary axle 31, and the fittings shown, may be readily applied to the rear end of an ordinary truck frame, thereby converting the same from a four wheel to a six wheel truck and permitting the auxiliary or dead axle to trail and follow the movement of the vehicle, the drive remaining through the usual wheels and driving axle without modification.

I claim:

1. In a vehicle, the combination of a frame having a driving axle and wheels, a dead axle also having wheels behind said wheels, and a torque-resisting member connected to the dead axle, a rock shaft transversely attached to the frame, springs connecting the ends of the rock shafts to the respective axles, a swivel arm having a yoke at its front end laterally slideably mounted on the rock shaft and swivelly connected at its rear end to the torque-resisting member on the dead axle, said yoke being automatically slidable on the rock shaft, solely in consequence of variations in the shape of the springs incident to forces exerted by the vehicle rounding a curve.

2. In a vehicle, the combination of a frame provided with a driving axle and wheels, a dead axle with wheels behind said wheels, equalizing springs connecting the frame and the respective axles, a cylindrical member extending crosswise of the frame near the equalizing center of the springs, a swivel arm having a yoke at one end, a torque-resisting member attached to the dead axle, said swivel arm being swivelly mounted in said torque-resisting member and the yoke of the swivel arm being adapted to engage the said cylindrical cross member at its middle portion, with freedom to move automatically and transversely in a substantially horizontal plane solely in consequence of the variations in shape of the springs incident to forces exerted by the vehicle rounding a curve.

3. In a multiwheel vehicle, the combination with a main frame, of an auxiliary frame superimposed thereon, a drive axle housing with wheels, a dead axle also with wheels, flat leaf spring elements in supporting relation between the said axles and auxiliary frame adapted to distribute vertical loads from the said frame in substantially equal proportion between the driving axle and the dead axle, torque-resisting means on the dead axle in laterally slideable relation with a cross-member of the said auxiliary frame, and radius rods transversely pivoted to the main frame and to the drive axle housing and having flexible laminated spring leaf portions intermediate their pivoted front ends to the frame, said torque-resisting means being automatically slidable as stated, solely in consequence of the relative arching and flattening of the springs at opposite sides of the vehicle incident to forces exerted by the vehicle rounding a curve.

PHILIP T. ROBIN.